Dec. 18, 1934.  W. K. KEARSLEY  1,985,097
LIGHT CONTROL APPARATUS
Filed Dec. 1, 1933
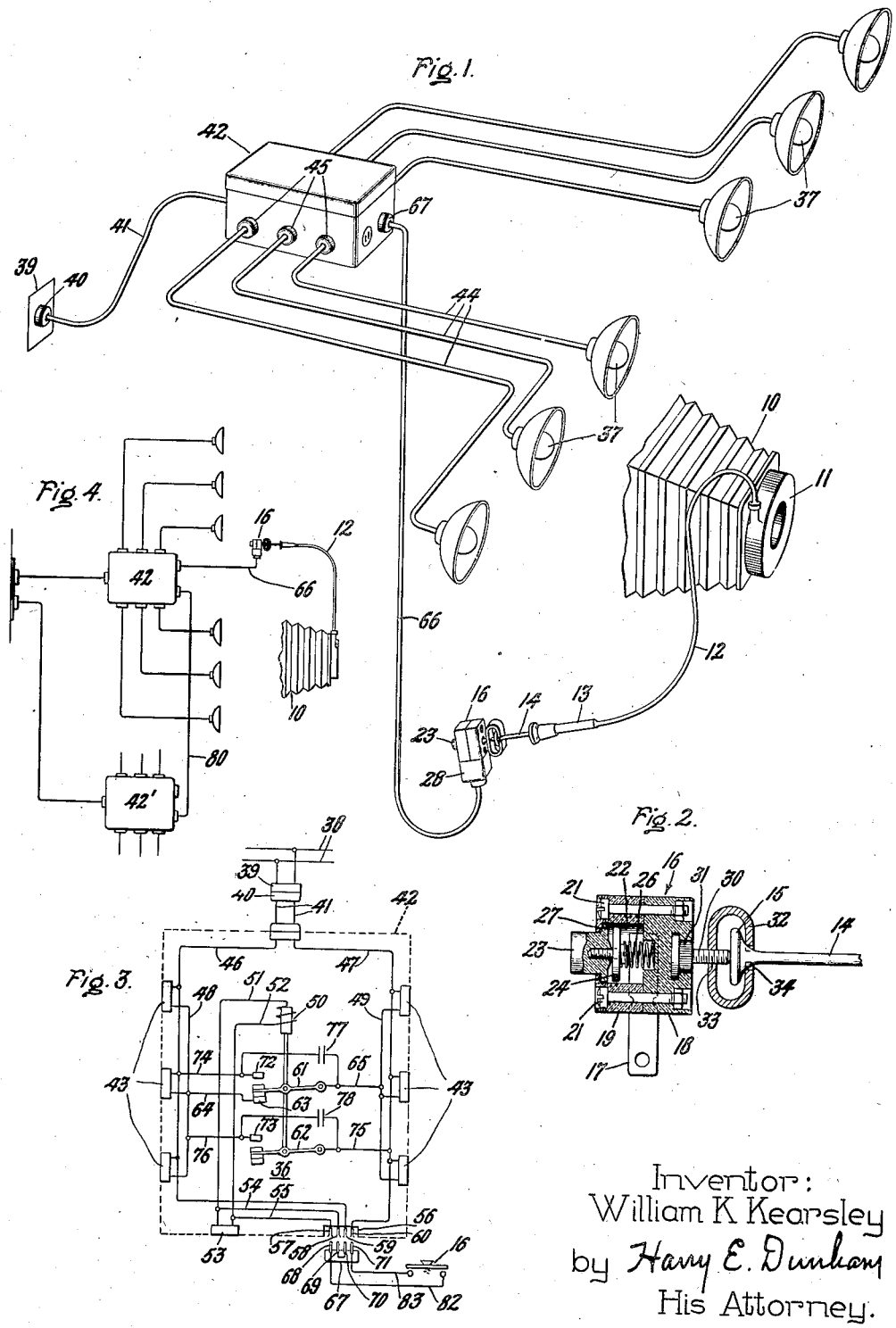
Inventor:
William K Kearsley
by Harry E. Dunham
His Attorney.

Patented Dec. 18, 1934

1,985,097

UNITED STATES PATENT OFFICE 1,985,097

LIGHT CONTROL APPARATUS

William K. Kearsley, Schenectady, N. Y., assignor to General Electric Company, a corporation of New York Application December 1, 1933, Serial No. 700,481

3 Claims. (Cl. 240—1.3)

My invention relates to light-control apparatus and especially to light-control apparatus for use with photographing apparatus.

The principal object of my invention is to provide an improved switch for use with the control shutter of a camera and the electric light circuit used for illuminating the person to be photographed whereby the necessary intense light will be had only during the exposure of the film.

Another object of my invention is to provide an improved switch for attachment to the operating member or button, termed usually the antinous release, for the camera shutter of substantially any type of camera now available in the open market.

Another object of my invention is the provision of apparatus which can be used in multiples to provide for the necessary illumination for the photographing of single or groups of persons and in which the light can be controlled from a single point simultaneously with the operation of the camera shutter irrespective of the number of lighting units used.

For a consideration of what I believe to be novel and my invention, attention is directed to the following specification, the accompanying drawing and the appended claims.

In the drawing, Fig. 1 illustrates my equipment assembled and ready for use; Fig. 2 illustrates a cross section of the operating switch and the means for fastening it to the antinous release; Fig. 3 is a diagrammatic illustration of the arrangement and connections of apparatus in the control unit operated by the switch shown in Fig. 2; and Fig. 4 illustrates, diagrammatically, the method of connecting units in multiple for controlling them by a single control switch as shown in Fig. 2.

Referring to the drawing in detail, Fig. 1 illustrates a camera 10 whose shutter 11 is controlled by release mechanism 12 comprising a sleeve terminating in a handle 13 and a push rod 14 provided with a head 15. The push rod 14 is connected to a flexible wire within the sleeve 12 and opens the camera shutter when it is pushed into the handle 13.

One of the difficulties encountered in the manufacture of a switch of this type is to make it universally applicable to the different sized standard antinous releases available in the open market. Furthermore, due to the sensitivity of the mechanism it is desirable to keep the switch button in alinement with the button of the release so that the switch and release can be operated by the thumb and two fingers in the same manner as the release alone can be operated. I accomplish these desirable objects with the control switch 16. This switch comprises two contact members 17 which are partly embedded in insulating member 18. A second insulating member 19 is attached to the member 18 by bolts 21 and is provided with a chamber 22 within which a button 23 carrying a disc 24 may be moved against the pressure of a spring 26. The button 23 projects out of the chamber 22 and is held within the chamber against the pressure of spring 26 by a flange 27 on the button engaging a similar flange projecting from the walls of the chamber 22. When the button is pushed in, the disc 24 engages the two contact members 17 and thereby closes a circuit across them. The contacts 17 project out of the insulating members for engagement by a socket 28 as will be presently explained.

The means for attaching the switch 16 to the antinous release head 15 comprises a screw 30, the head 31 of which is moulded into the insulating member 18. An elliptically shaped clamping member 32 is provided with a threaded hole 33 on one of its sides and a transverse slot 34 on the other, both the threaded hole and slot being alined with the minor axis of the clamp. For fastening the switch 16 to the head 15 it is only necessary to insert the stem 14 into the slot 34 so that the head 15 is in the elliptical clamp 32 and then turn the screw 30 until it presses the head 15 against the sides of the slot 34. The sides of the slot 34 are notched so that the clamp will automatically center itself with respect to the head 15. The clamp 32 is made large enough to accommodate the largest head 15 that may be found on antinous releases available on the market, and the slot 34 is made small enough to hold the smallest head. It is thus possible to clamp any antinous release ranging from the largest to the smallest and each one is automatically centered with respect to the switch 16 so that there is a minimum of interference in the operation of the antinous release due to the addition of the switch.

The switch 16 closes the circuit to the operating coils of a circuit breaker or contactor 36 which is diagrammatically illustrated in Fig. 3. This contactor in the present embodiment of the invention changes the connection of lamps 37 in such a manner that when the switch 16 is open and the circuit breaker is therefore also in the open position, the lamps are connected in pairs across a potential source 38. The source 38 is preferably a standard wall outlet socket 39 from which current is obtained by a plug 40 and a two-conductor cord 41. The cord 41 terminates in a box 42. The contactor 36 is mounted in box 42. In the wall of this box sockets 43 are mounted and lamps 37 are connected thereto through cords 44 and plug caps 45.

The connections within the box 42 are diagrammatically shown in Fig. 3. The cord 41 comprises two conductors 46 and 47 which are connected to one terminal of the sockets on the two sides of the box respectively. The second contacts of the receptacles on the left-hand side of the box 42 are connected to each other through a conductor 48, and the second contacts of the receptacle on the other side of the box are connected to each other through the conductor 49. The operating coil 50 of switch 36 is connected by conductors 51 and 52 to the terminals of a receptacle 53 and by conductors 54 and 55 to a receptacle 56. The receptacle 56 contains four contacts 57, 58, 59 and 60 which are connected to conductors 55, 54, 46 and 47 respectively.

The contactor 36 is provided with two arms 61 and 62. When the contactor is in the open position the arm 61 engages a contact 63 and thereby connects conductor 48 to conductor 49. The circuit may be traced from conductor 48 to conductor 64, contact 63, switch arm 61, conductor 65 to conductor 49. With this connection, a lamp connected to one side of the box is in series with a lamp connected to the other side of the box. With this arrangement, it is of course possible to obtain an unbalanced lighting effect by connecting one lamp to one side of the box and two or more lamps to the other side. If an equal number of lamps are connected to the two sides of the box however and the lamps are substantially of the same resistance, the illumination obtained from the lamps will be equally distributed. The circuit for this series connection may be traced from the source 38 to conductor 46 through a lamp on the left side of the box, conductors 48 and 64, contact 63, switch arm 61 to conductors 65 and 49, to a lamp on the right side of the box, back to conductor 47 and to the source 38.

After the switch 16 is properly mounted on the antinous release, it is connected to the box 42 by a socket 28 which engages the contacts 17, a two-conductor cord 66 attached to the socket 28, and by means of a plug cap 67 to the receptacle 56. This plug cap contains four contacts 68, 69, 70, and 71 which respectively engage the receptacle contacts 57, 58, 59 and 60. When the button 23 is pressed in, a circuit to the operating coil 50 is closed and the switch arms 61 and 62 are moved into engagement with the contacts 72 and 73 respectively. When these switch contacts are thus engaged, all the lamps are connected directly across the source. The circuits may be traced from conductor 46 to conductor 74, contact 72, switch arm 61, conductors 65 and 49. As above stated, the contacts of the receptacles on the right-hand side of the box are connected respectively to conductors 47 and 49. Conductor 47 is directly connected to the source 38 and the conductor 49, being connected to the conductor 46 on the other side of the source, all the lamps connected to receptacles on the right-hand side of the box are therefore connected directly to the source. The switch arm 62 closes a circuit from conductor 47, one side of the source 38, through conductor 75, contact 73 and conductor 76, to conductor 48. On the left-hand side of the box 42 the contacts of the receptacles are connected respectively to conductors 46 and 48. When the switch arm 62 closes a circuit between conductors 46 and 47, therefore, the lamps on the left-hand side of the box are connected to the source in multiple with each other. Condensers 77 and 78 are respectively connected across the switch arms 61 and 62 and their respective contacts 72 and 73 for the purpose of reducing arcing at the contacts.

For the purpose of using several of the boxes 42 and controlling them from one switch 16, the box 42 is provided with a receptacle 53, the contacts of which are connected to the operating coil 50. It is, therefore, necessary only to connect receptacle 53 of one box to the corresponding receptacle on a second box for operating the coils in multiple by one switch 16. Such connection is shown in Fig. 4 where a box 42' is connected to a source of current just as box 42 is connected and a cord 30 provided with suitable plug caps at its respective ends connects the contactor coils in multiple. Any desired number of such boxes may thus be connected in multiple.

The switch 16 having its contacts 17 engaged by a socket 28 controls the coil 50 through the cord 66 having conductors 82 and 83 connected respectively to contacts 68 and 71 of plug 67. The plug 67 is further provided with contacts 69 and 70, which are connected to each other. When the plug 67 is placed into the socket 56 and the respective contacts are in engagement the switch 16 is in position to close the contactor coil circuit. This circuit may be traced from conductor 47, contacts 60 and 71, conductor 83, switch 16, conductor 82, contacts 68 and 57, conductors 55 and 52, coil 50, conductors 51 and 54, contacts 58, 69, 70 and 59 to conductor 46.

In operation the switch 16 is attached to the antinous release of a camera, the lights are properly distributed and as many boxes 42 as are needed are connected in multiple. When the proper poses are obtained the operator presses the push button with his thumb. The spring 26 is made weaker than the spring of the antinous release so that the switch is closed and the lights are connected in multiple before the camera shutter is opened. Further pressure on the push button moves the switch and the antinous release to open the camera shutter. The light thus obtained is sufficient to take snapshots or very short exposures and the subjects have no time to alter their respective poses before the picture is actually taken.

What I claim as new and desire to secure by Letters Patent of the United States is:

1. In a photographic light control apparatus, a control switch comprising a push button, a housing therefor, a pair of contacts which are connected to each other when said push button is pressed into said housing, and a clamp for attaching said control switch to the head of a camera release mechanism comprising a screw attached to said housing and axially aligned with said push button, a clamping member for engaging said head mounted upon said screw, and means for securing said head between said screw and said clamping member so as to axially align said release mechanism with said control switch.

2. A light control switch for use with photographic cameras including a housing, a push button mounted for movement in said housing, a contact disk attached to said button, a pair of contact members arranged to project outside of said housing for engagement by a socket and by said contact disk when said push button is pressed into said housing, and a clamp for securing said switch to a camera release mechanism.

including a screw axially aligned with said push button and attached to said housing, and a clamping member rotatably mounted upon said screw and provided with a centering slot opposite the end of said screw for receiving the head of a camera release mechanism whereby the turning of said member on said screw centers the release head and clamps it in axial alignment with said push button.

3. A light control switch for use with photographic apparatus including a housing provided with a pair of contacts, a push button for completing a circuit through said contacts normally biased away from said contacts, clamping means for clamping said housing to a camera release button comprising a screw attached to said housing in axial alignment with said push button and an elliptical clamping member provided with a threaded hole on one of its long sides arranged for receiving the said screw and provided with a slot having V-shaped sides arranged opposite to the said threaded hole whereby the clamp may receive and center any sized camera release button and clamp said button in axial alignment with said bush button between the end of said screw and said clamp.

WILLIAM K. KEARSLEY.